United States Patent
Makeev et al.

(10) Patent No.: US 11,442,255 B2
(45) Date of Patent: Sep. 13, 2022

(54) WIDE ANGLE LENS AND CAMERA SYSTEM FOR PERIPHERAL FIELD OF VIEW IMAGING INCLUDING EIGHT LENSES OF ---++-++ OR NINE LENSES OF ----++-++ REFRACTIVE POWERS

(71) Applicant: Owl Labs, Inc., Somerville, MA (US)

(72) Inventors: Maksim Makeev, Somerville, MA (US); Mark S Schnittman, Somerville, MA (US); Xiaoyu Miao, Palo Alto, CA (US); Ming-lin Lee, Taipei (TW); Cheng-Yi Lai, Taipei (TW); Chien-Hung Chou, Taipei (TW)

(73) Assignee: Owl Labs, Inc., Somerville, MA (US)

( * ) Notice: Subject to any disclaimer, the term of this patent is extended or adjusted under 35 U.S.C. 154(b) by 109 days.

(21) Appl. No.: 16/617,277

(22) PCT Filed: May 31, 2018

(86) PCT No.: PCT/US2018/035328
§ 371 (c)(1),
(2) Date: Nov. 26, 2019

(87) PCT Pub. No.: WO2018/222827
PCT Pub. Date: Dec. 6, 2018

(65) Prior Publication Data
US 2020/0192069 A1    Jun. 18, 2020

Related U.S. Application Data

(60) Provisional application No. 62/514,080, filed on Jun. 2, 2017.

(51) Int. Cl.
*G02B 13/06* (2006.01)

(52) U.S. Cl.
CPC .................................. *G02B 13/06* (2013.01)

(58) Field of Classification Search
CPC ............................. G02B 13/06; G02B 13/005
See application file for complete search history.

(56) References Cited

U.S. PATENT DOCUMENTS

| | | | |
|---|---|---|---|
| 4,412,726 | A | 11/1983 | Horimoto |
| 7,283,312 | B2 | 10/2007 | Kawada |
| 2003/0107820 | A1 | 6/2003 | Nanba |
| 2004/0211907 | A1 | 10/2004 | Wellman |
| 2004/0257677 | A1 | 12/2004 | Matsusaka |
| 2009/0052059 | A1 | 2/2009 | Lin |
| 2012/0120505 | A1 | 5/2012 | Nakai |
| 2016/0202454 | A1 | 7/2016 | Chang |
| 2016/0292884 | A1 | 10/2016 | Schnittman |

(Continued)

FOREIGN PATENT DOCUMENTS

CN    106772951 A   *   5/2017

OTHER PUBLICATIONS

Kodak PixPro SP360 Action CamManual; 2014 JK Imaging Ltd.

(Continued)

*Primary Examiner* — Wen Huang
(74) *Attorney, Agent, or Firm* — Niels Haun; Dann, Dorfman, Herrell & Skillman, P.C.

(57) ABSTRACT

Wide angle lens for imaging objects disposed away from the optical axis towards the periphery of the field of view.

39 Claims, 14 Drawing Sheets

(56) References Cited

U.S. PATENT DOCUMENTS

2017/0108671 A1    4/2017  Eguchi
2018/0017765 A1*   1/2018  Tang .................. G02B 27/0025
2018/0172961 A1*   6/2018  Wu ......................... G02B 9/62

OTHER PUBLICATIONS

James J. Kumler and Martin L. Bauer "Fish-eye lens designs and their relative performance", Proc. SPIE 4093, Current Developments in Lens Design and Optical Systems Engineering, Oct. 24, 2000.
Nick Fang ; Lecture Notes on Geometrical Optics; 2.71/2.710 Introduction to Optics; MIT OpenCourseWarehttp://ocw.mit.edu; Spring 2014; Feb. 18, 2014.

* cited by examiner

WIDE ANGLE LENS AND CAMERA SYSTEM FOR PERIPHERAL FIELD OF VIEW IMAGING INCLUDING EIGHT LENSES OF ---++-++ OR NINE LENSES OF ----++-++ REFRACTIVE POWERS

RELATED APPLICATIONS

This application is a national stage application under 35 U.S.C. 371 for International Application No. PCT/US18/35328, filed on May 31, 2018, which claims the benefit of priority of U.S. Provisional Application No. 62/514,080, filed on Jun. 2, 2017, the entire contents of which application(s) are incorporated herein by reference.

FIELD OF THE INVENTION

The present invention relates generally to wide angle lenses, and more particularly, but not exclusively, to lenses configured to preferentially image objects located towards the periphery of the field of view, as well as camera systems incorporating such lenses.

BACKGROUND OF THE INVENTION

Axiomatic to optical imaging systems is the principle that such systems are designed with the expectation that objects of primary interest will be located on the optical axis of the imaging system, and therefore lenses of such systems must be designed to provide high quality imaging on-axis. Indeed, one will typically accept reduced optical performance at the edges of the field of view in favor of enhanced performance on-axis. Photography, microscopy, and astronomy are all examples of fields in which the observer often endeavors to position the optical system so that at least one object of interest is disposed centrally in the field of view on the optical axis.

In contrast, Applicant has conceived of applications in which all objects of interest will be disposed away from the optical axis towards the periphery of the field of view. Consequently, Applicant has recognized that existing lenses which are optimized for on-axis performance are not well-suited to peripheral field of view imaging in part due to the unneeded optimization of on-axis-performance. Accordingly, it would be an advance in the state-of-the-art to provide wide angle lenses which are optimized for imaging objects located at the periphery of the field of view rather than on-axis.

SUMMARY

In accordance with one of its aspects, the present invention may provide a wide angle lens for imaging objects disposed in a peripheral region of interest of the field of view. An exemplary wide angle lens in accordance with the present invention may include, in order along an optical axis from object to image space, a first group of lens elements, an aperture stop, and a second group of lens elements. The region of interest may be an annular cone that extends between a first angle of at least 30 degrees from the optical axis to a second angle of at least 75 degrees from the optical axis, where the first and second lens groups are configured for imaging of objects disposed within the region of interest. The wide angle lens may have a ratio of the first angle to the second angle in the range of R=1.67:1 to 2.5:1. In particular, the first angle may be 50 degrees and the second angle may be 100 degrees. The lens may be configured and constructed such that a ray of the second angle in object space intersects the lens image plane at a distance, H, from the optical axis and a ray of the first angle in object space intersects the lens image plane at a distance, h, from the optical axis such that $H/h > R$, or preferably $H/h \geq 1.1 \times R$, or more preferably $H/h \geq 1.5 \times R$ The angular mapping of the field of view in the region of interest onto the image plane may be substantially linear.

The first and second groups of lens elements may be configured for imaging of objects disposed within the region of interest by having certain performance metrics in the region of interest. For example, the first and second groups of lens elements may cooperate to provide: a longitudinal spherical aberration on-axis greater than the longitudinal spherical aberration throughout the region of interest; a longitudinal spherical aberration throughout the region of interest less than half of the longitudinal spherical aberration on-axis; a field curvature for tangential rays on-axis greater than the field curvature for tangential rays throughout the region of interest; and/or a field curvature for tangential rays throughout the region of interest less than one quarter of the field curvature for tangential rays on-axis.

Further, the first and second groups of lens elements may cooperate to provide: a modulation transfer function of at least 55% at 187 lp/mm for sagittal rays in the region of interest; a modulation transfer function of at least 76% at 93 lp/mm for sagittal rays in the region of interest; a modulation transfer function of at least 36% at 187 lp/mm for tangential rays in the region of interest; and/or a modulation transfer function of at least 65% at 93 lp/mm for tangential rays in the region of interest. Also of note, exemplary wide angle lenses in accordance with the present invention may be optimized without the use of aspherical surfaces; the lens elements of the first and second groups may all have spherical surfaces. The first group of lens elements may consist of four or five lenses, while the second group of lens elements may consist of four lenses. The effective focal length may be 1 mm or less with an f-number of 2.4 or less.

In another of its aspects, the present invention may provide a wide angle lens having an angular field of view, FOV, of more than 150 degrees spanning the optical axis and a central half-field of view, $FOV_{1/2}$, spanning the optical axis. The ratio of the angular range $FOV_{1/2}$ of the central half field of view versus the angular range of the field of view FOV may be $FOV/FOV_{1/2}=2$, with the lens being constructed and arranged such that a ratio of a diameter ($D_1$) at the image plane of an image circle of the field of view versus the diameter ($D_{1/2}$) of an image circle of the central half-field of view is $D_1/D_{1/2} > 2$. The ratio of $D1/D½ \geq 2.2$, or preferably $D1/D½ \geq 2.5$, or more preferably $D1/D½ \geq 3$. The lens may comprise a region of interest disposed between the $FOV_{1/2}$ and FOV, wherein angular mapping of the field of view in the region of interest onto the image plane is substantially linear. Additionally, the present invention may provide a camera system comprising wide angle lens of the present invention.

BRIEF DESCRIPTION OF THE DRAWINGS

The foregoing summary and the following detailed description of exemplary embodiments of the present invention may be further understood when read in conjunction with the appended drawings, in which.

DETAILED DESCRIPTION OF THE INVENTION

Figure 1:
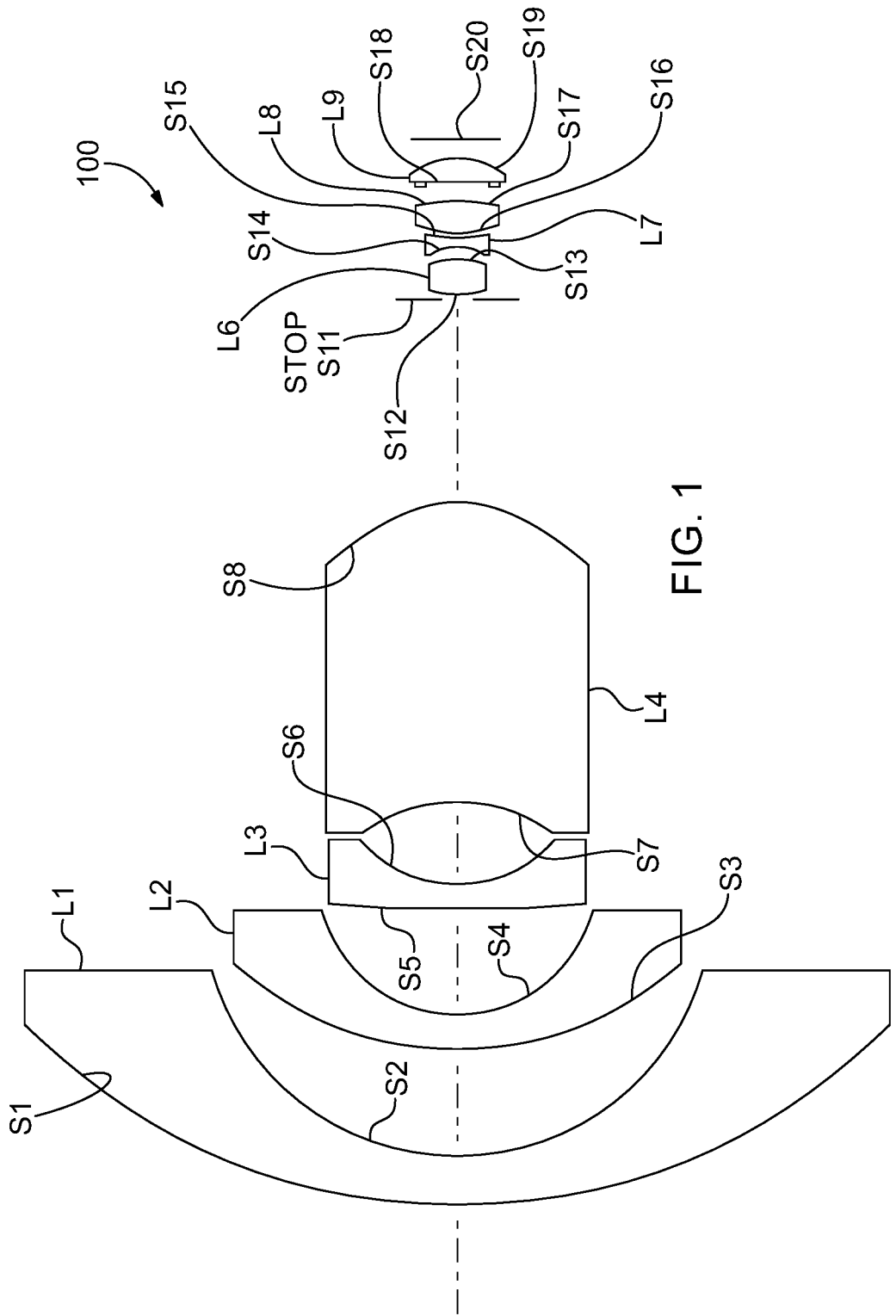
FIG. 1 schematically illustrates an exemplary eight element lens in accordance with the present invention.
Figure 3:
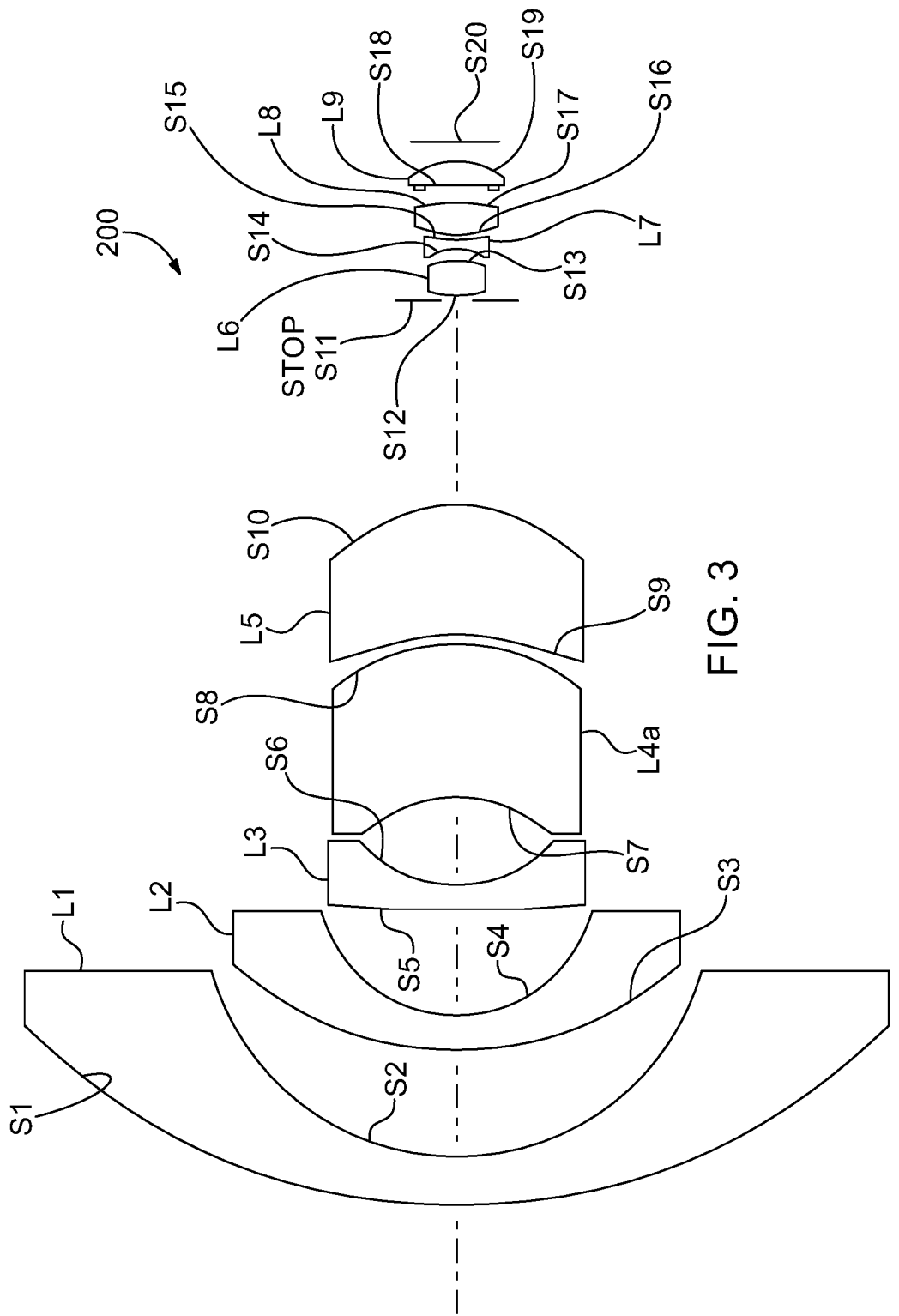
FIG. 3 schematically illustrates an exemplary nine element lens in accordance with the present invention.

Referring now to the figures, wherein like elements are numbered alike throughout, FIGS. 1 and 3 schematically illustrate configurations of exemplary wide angle lenses 100, 200 optimized for performance towards the outer half of the field-of-view in accordance with the present invention. The lenses 100, 200 may have a wide field-of-view of 210° (±105° on either side of the optical axis), and may be optimized for optical performance within a region of interest of the field-of-view. Specifically, with the goal of imaging objects disposed in the periphery of the field-of-view, the region of interest may comprise an annular cone beginning at 50° from the optical axis and extending to 100° from the optical axis. Optical performance outside of the region of interest, e.g., a cone between 0° and 50° field-of-view, may be relaxed and have inferior optical performance to that found in the region of interest. For example, the spherical aberration of the lenses 100, 200 may be well corrected for 50° and above as compared to 50° and below. In addition, by relaxing the requirements for optical performance outside of the region of interest, Applicant has been able to achieve designs in which all optical surfaces are spherical, avoiding the manufacturing complexities and cost associated with aspherical surfaces.

Turning to the configuration of lens 100 of FIG. 1 more particularly, the lens 100 may include a first group of four optical elements L1-L4 disposed on the object side of an aperture stop S11 and may include a second group of four optical elements L6-L9 disposed on the image side of the stop S11, with first-order design properties shown in Table 1. The first two lenses, L1, L2, are meniscus-type lenses having surfaces which are convex to the object side, and introduce negative power to decrease entering ray angles to be more parallel to the optical axis. Optionally, lens L4 of the lens 100 of FIG. 1 may be replaced by two lens elements L4a, L5, with all other lenses L1-L3 and L6-L9 remaining the same, as shown in Table 2 and FIG. 3. The optical glasses provided in Tables 1, 2 refer to glasses from Schott North America, Inc, Elmsford, N.Y., USA, and Nd refers to a wavelength of 587.6 nm. The cyclic olefin copolymer "COC" in Tables 1, 2 may be APEL™ Cyclo olefin copolymer APL5014CL (Mitsui Chemicals, Inc., Tokyo, Japan).

TABLE 1

Eight element design

| Surface | R(mm) | d(mm) | Nd | Vd | Note | Material |
|---------|-------|-------|-------|------|------|----------|
| S1 | 29.2909 | 2.3865 | 1.806 | 41.00 | L1 | N-LASF43 |
| S2 | 12.2744 | 5.1328 | | | | |
| S3 | 16.1766 | 1.6535 | 1.804 | 46.6 | L2 | N-LASF44 |
| S4 | 6.7924 | 5.1229 | | | | |
| S5 | 82.6538 | 1.2012 | 1.64 | 60.2 | L3 | N-LAK21 |
| S6 | 6.2407 | 4.1457 | | | | |
| S7 | −6.7625 | 15.1741 | 1.544 | 56.00 | L4 | COC |
| S8 | −6.0836 | 10.2985 | | | | |
| S11 | infinity | 0.2611 | | | Stop | |
| S12 | 4.4027 | 1.6888 | 1.589 | 61.3 | L6 | P-SK58A |
| S13 | −3.8501 | 0.7362 | | | | |
| S14 | −2.6508 | 0.3804 | 1.642 | 22.5 | L7 | PC |
| S15 | 4.0385 | 0.2402 | | | | |
| S16 | 6.1489 | 1.5593 | 1.544 | 56.00 | L8 | COC |
| S17 | −3.6755 | 0.7822 | | | | |
| S18 | −37.2014 | 1.1781 | 1.544 | 56.00 | L9 | COC |
| S19 | −3.3096 | 0.9428 | | | | |
| S20 | Infinity | — | | | Image | |

TABLE 2

Nine element design

| Surface | R(mm) | d(mm) | Nd | Vd | Note | Material |
|---------|-------|-------|-------|------|------|----------|
| S1 | 29.2909 | 2.3865 | 1.806 | 41.00 | L1 | N-LASF43 |
| S2 | 12.2744 | 5.1328 | | | | |
| S3 | 16.1766 | 1.6535 | 1.804 | 46.6 | L2 | N-LASF44 |
| S4 | 6.7924 | 5.1229 | | | | |
| S5 | 82.6538 | 1.2012 | 1.64 | 60.2 | L3 | N-LAK21 |
| S6 | 6.2407 | 4.2648 | | | | |
| S7 | −5.5241 | 7.4709 | 1.544 | 56.00 | L4a | COC |
| S8 | −8.6995 | 0.3750 | | | | |
| S9 | −12.5165 | 6.3058 | 1.544 | 56.00 | L5 | COC |
| S10 | −6.2516 | 9.8205 | | | | |
| S11 | infinity | 0.2426 | | | Stop | |
| S12 | 4.4027 | 1.6888 | 1.589 | 61.3 | L6 | P-SK58A |
| S13 | −3.8501 | 0.7362 | | | | |
| S14 | −2.6508 | 0.3804 | 1.642 | 22.5 | L7 | PC |
| S15 | 4.0385 | 0.2402 | | | | |
| S16 | 6.1489 | 1.5593 | 1.544 | 56.00 | L8 | COC |
| S17 | −3.6755 | 0.7822 | | | | |
| S18 | −37.2014 | 1.1781 | 1.544 | 56.00 | L9 | COC |
| S19 | −3.3096 | 0.9428 | | | | |
| S20 | Infinity | — | | | Image | |

Figure 2A:
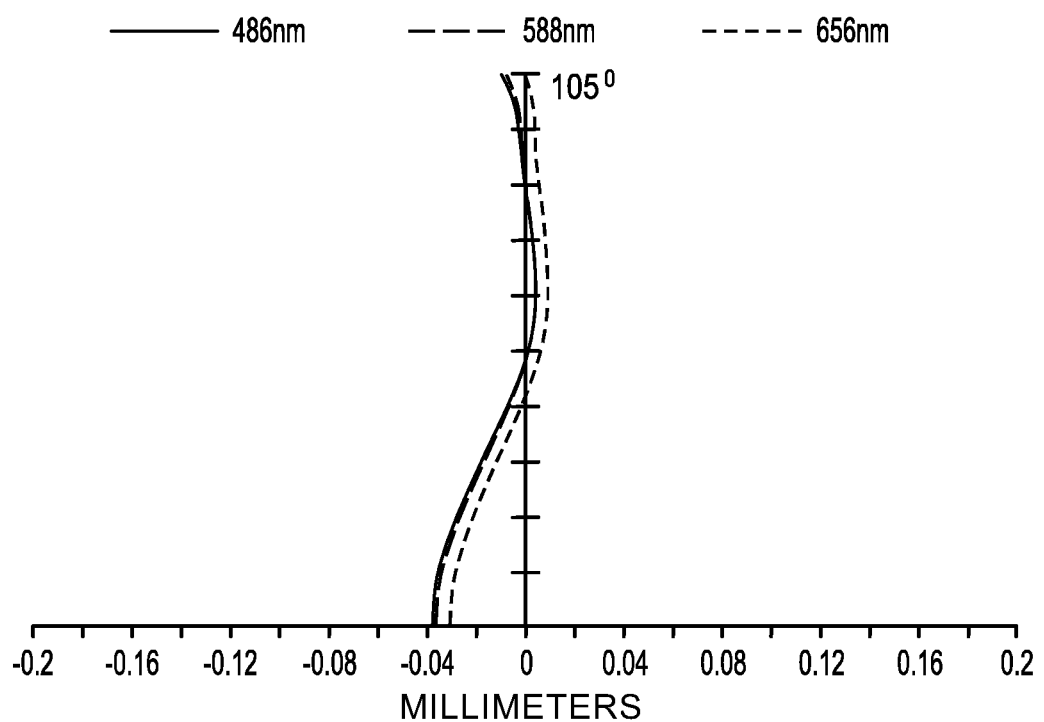
FIGS. 2A-2C illustrate the calculated longitudinal spherical aberration, field curvature, and f-theta distortion, respectively, of the lens of FIG. 1.
Figure 2B:
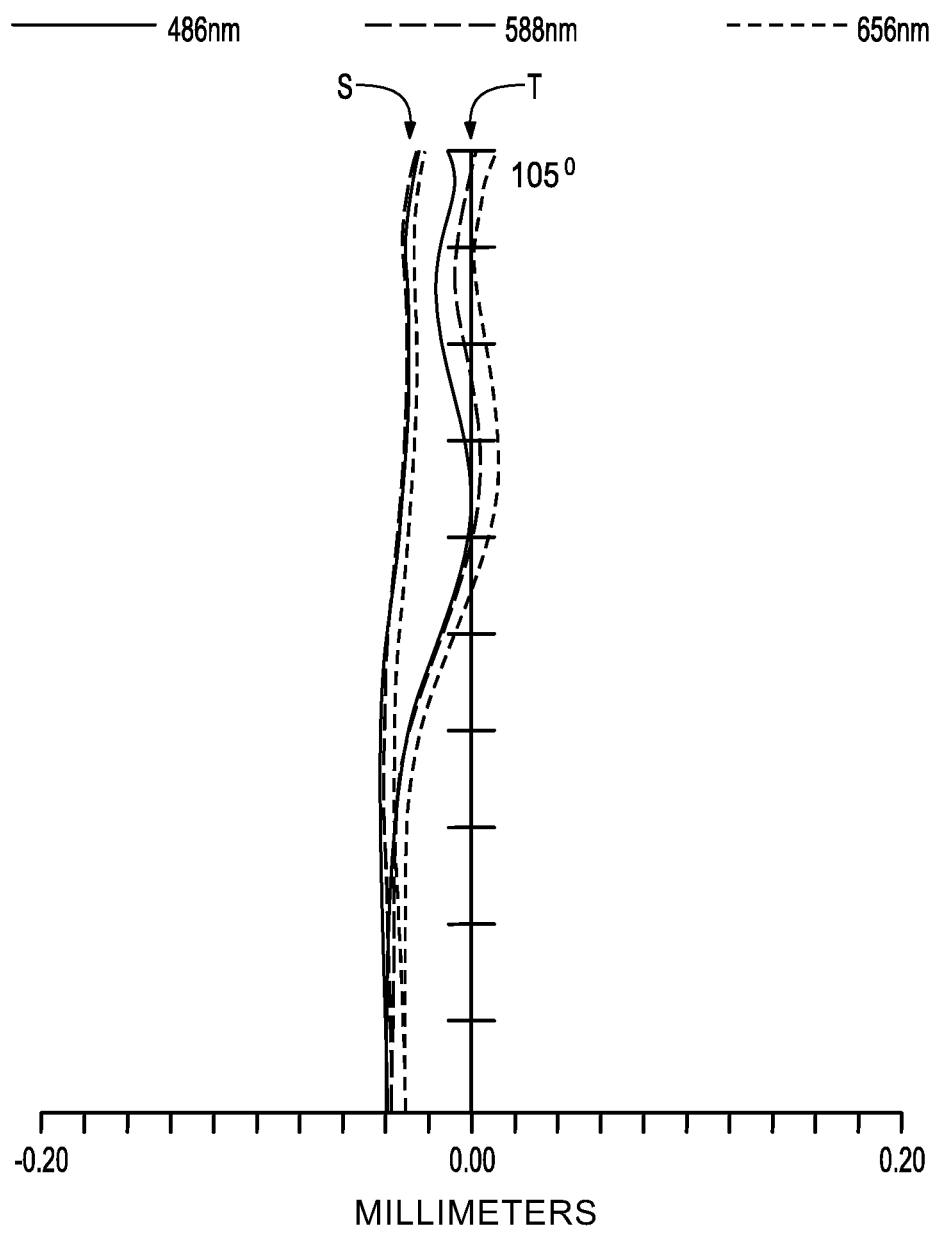
Figure 2C:
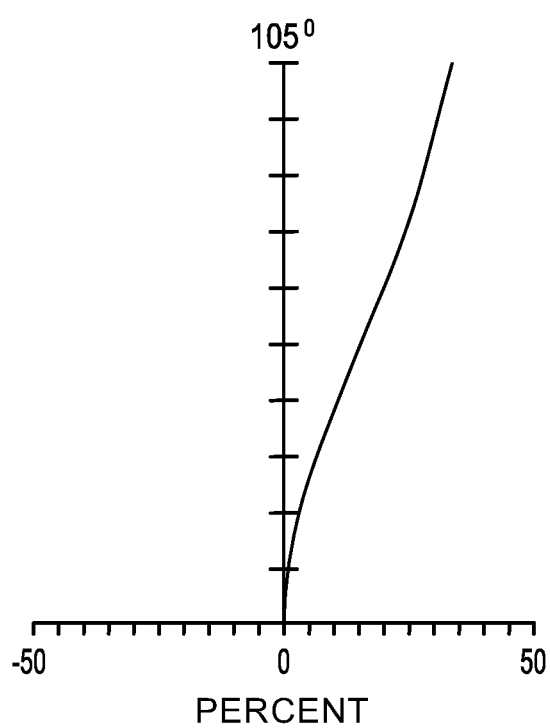
Figure 4A:
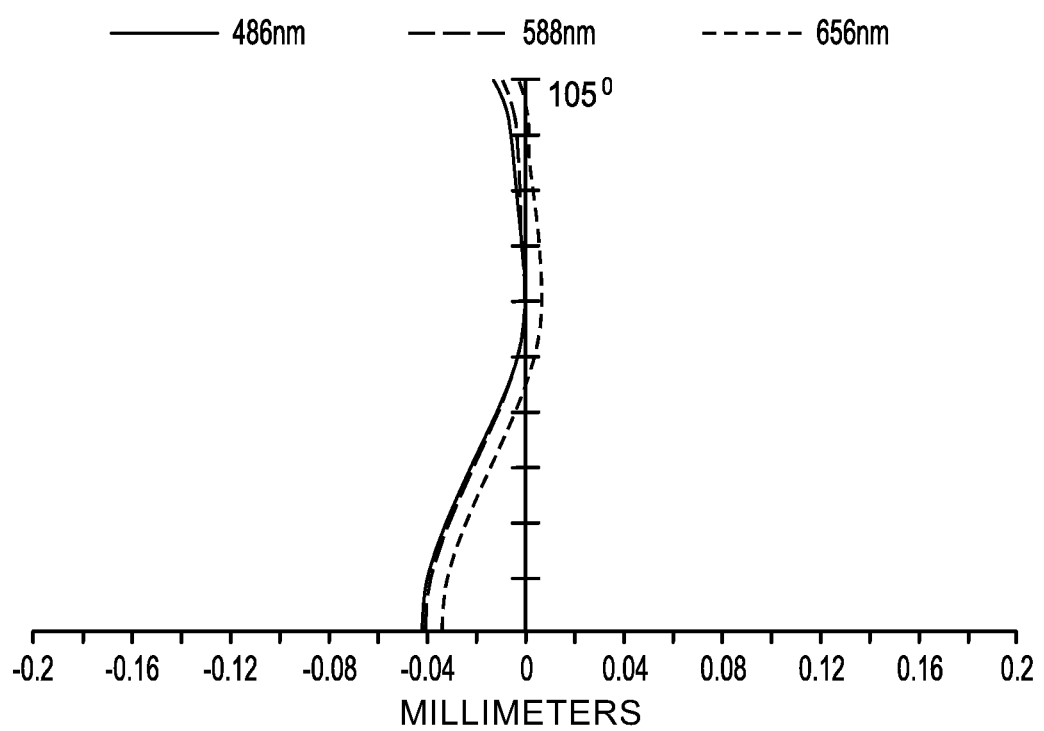
FIGS. 4A-4C illustrate the calculated longitudinal spherical aberration, field curvature, and f-theta distortion, respectively of the lens of FIG. 3.
Figure 4B:
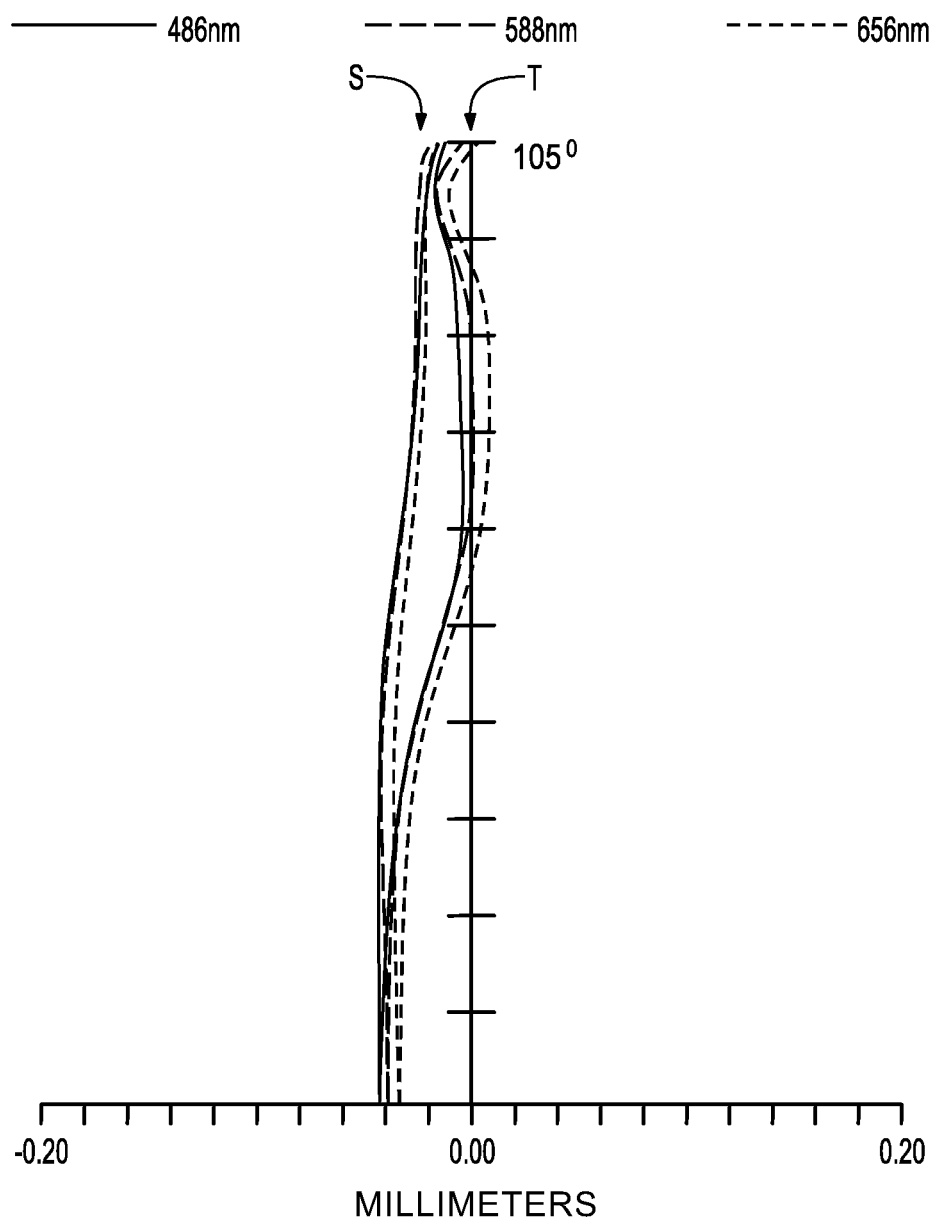
Figure 4C:
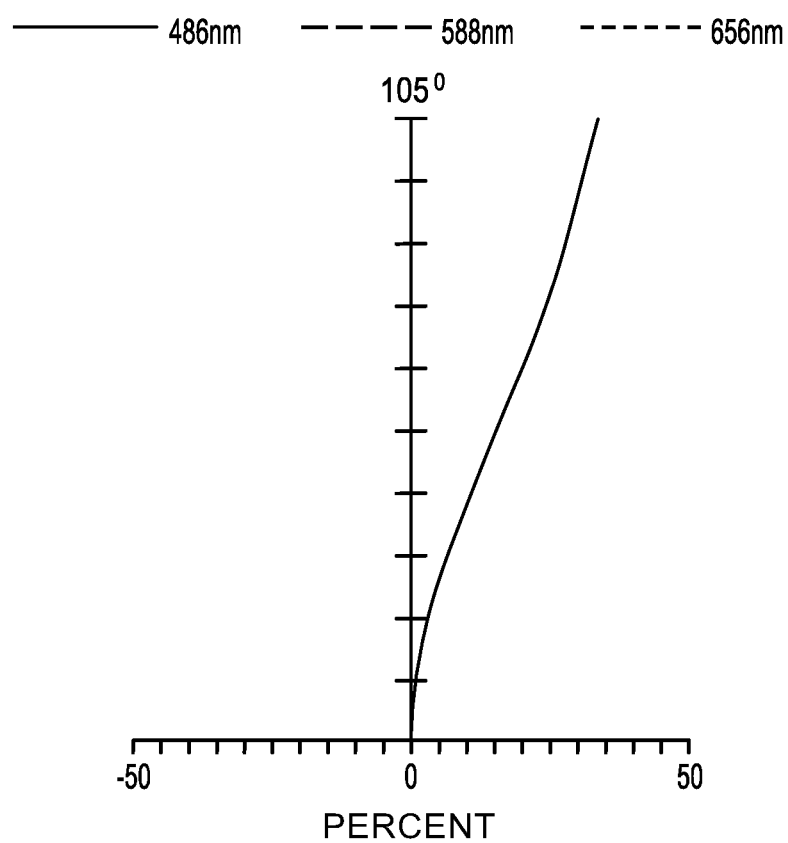

Regarding the optical performance, since designs in accordance with the present invention are focused on performance in a region of interest comprising an annular cone extending to the edge of the field-of-view, performance near the optical axis may be reduced. For example, in terms of classically defined aberrations, as illustrated in FIGS. 2A, 4A the longitudinal spherical aberration may be well corrected in the region of interest between 50° and 100°, while a relatively large spherical aberration on-axis of 40 μm may be tolerated. In particular, the longitudinal spherical aberration may be so well corrected in the region of interest that the value in the region of interest may be less than one quarter of that present on-axis. Similarly, field curvature, especially for tangential rays, may be minimized in the region of interest while being comparatively larger on-axis, FIGS. 2B, 4B. Like the spherical aberration, the field curvature for tangential rays in the region of interest may be less than one quarter of that present on-axis. While not intending to be bound by any particular theory, it is believed that third order field curvature may be corrected by introducing compensating higher order field curvature via lens element L5 of lens 200, and via lens elements L7, L8. F-theta distortion, unlike longitudinal spherical aberration and field curvature, may increase with field height without correction, but may be constrained to be less than 34% at full field, FIGS. 2C, 4C.

Figure 5:
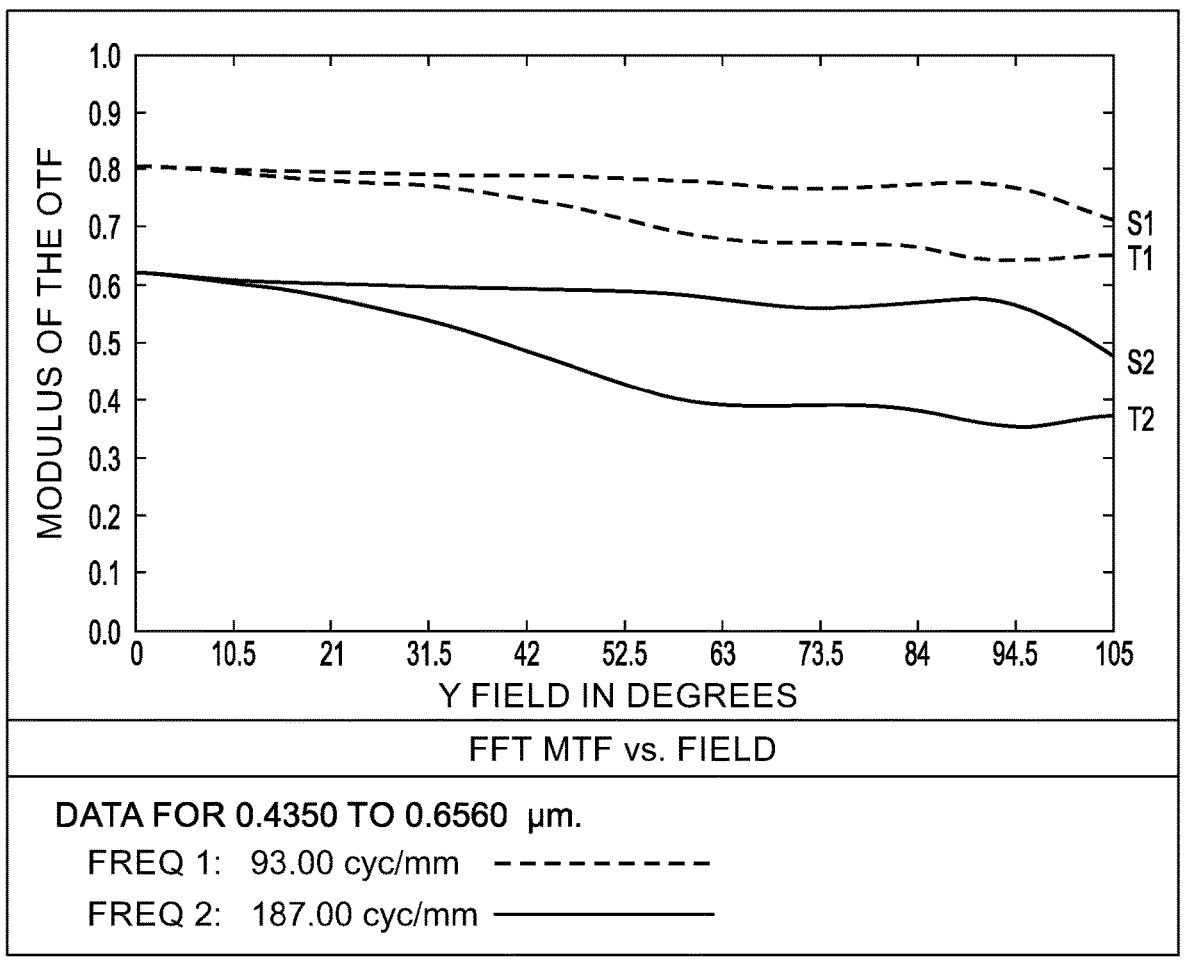
FIG. 5 illustrates the calculated modulation transfer function versus field for the lens of FIG. 3.
Figure 6:
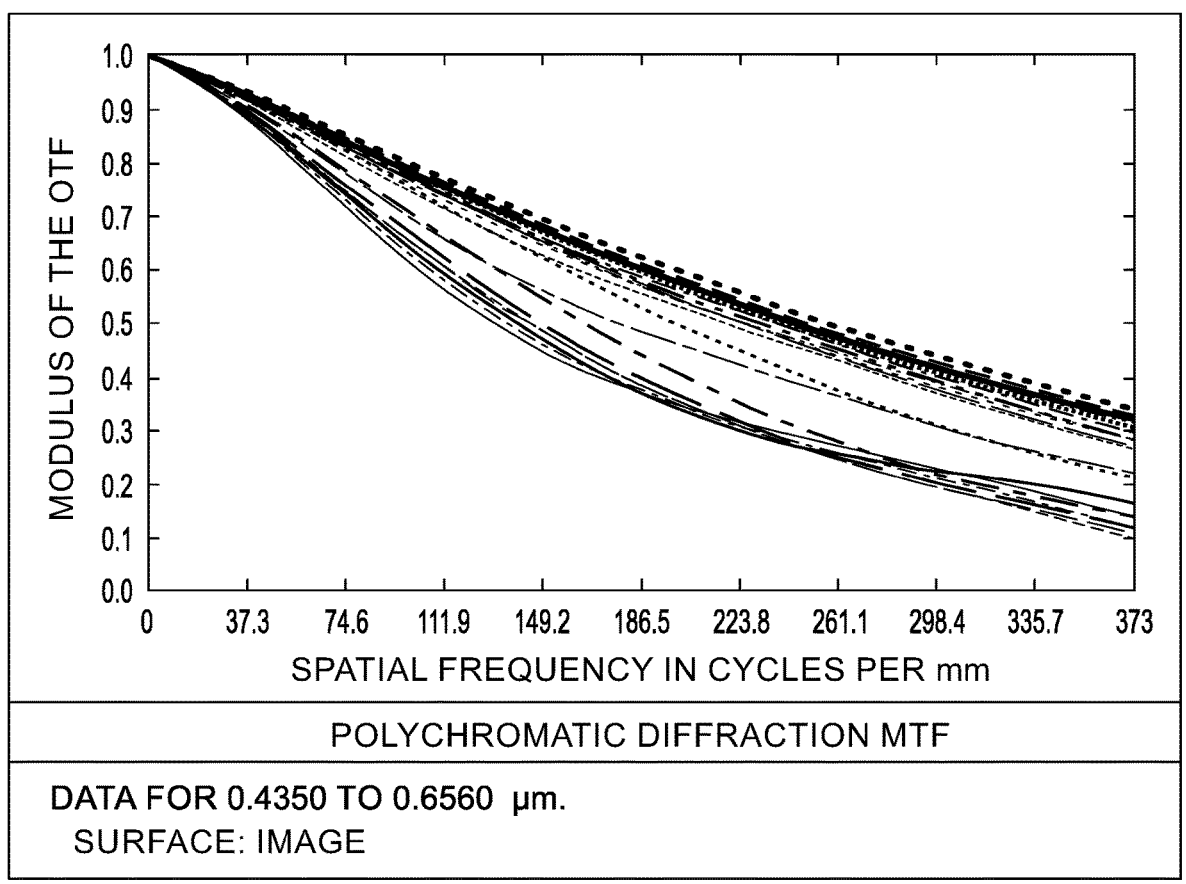
FIG. 6 illustrates the calculated polychromatic diffraction modulation transfer function versus spatial frequency for the lens of FIG. 3.
Figure 7:
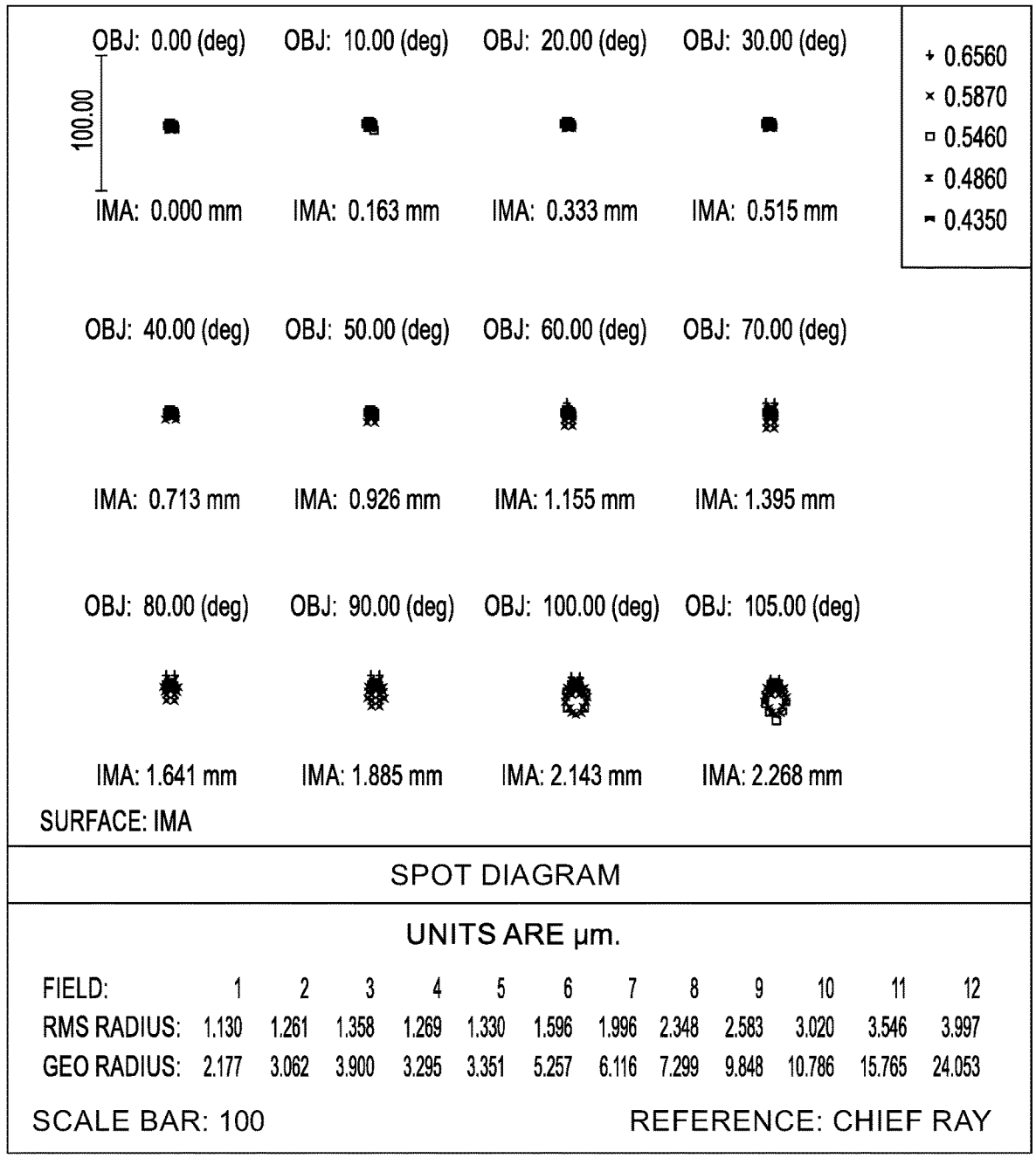
FIG. 7 illustrates calculated spot diagrams for the lens of FIG. 3.
Figure 8:
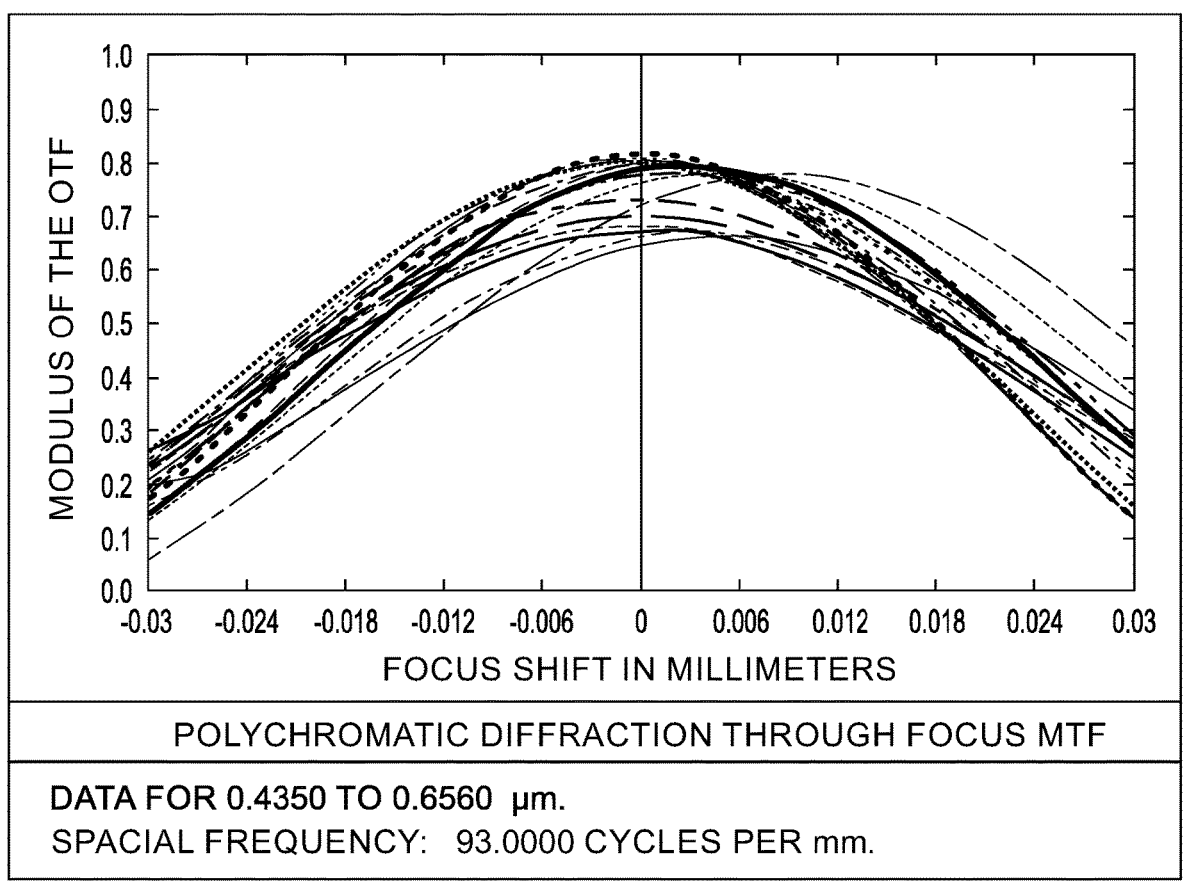
FIG. 8 illustrates the calculated polychromatic diffraction through focus modulation transfer function versus focus shift for the lens of FIG. 3.
Figure 9:
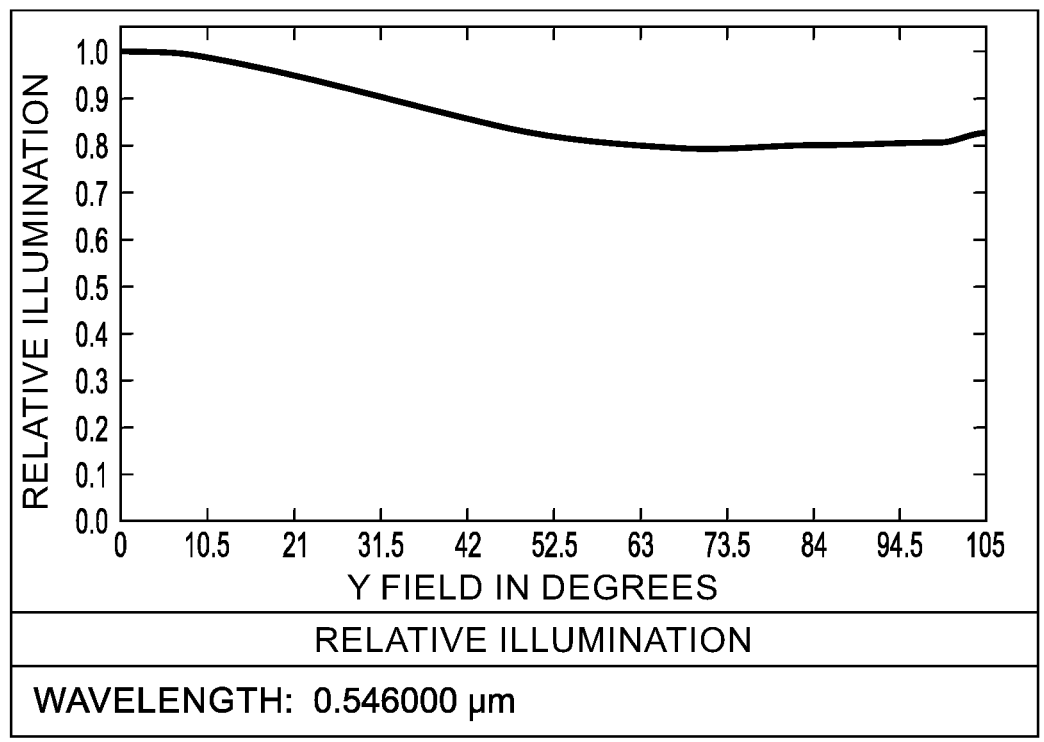
FIG. 9 illustrates the calculated relative illumination of the image plane versus field for the lens of FIG. 3.
Figure 10:
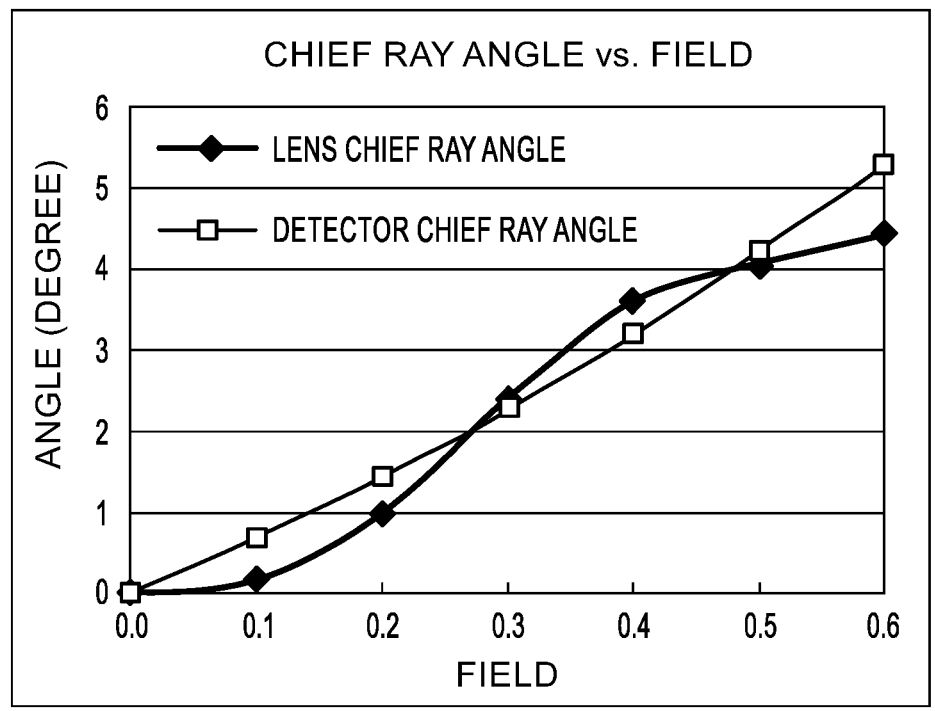
FIG. 10 illustrates the calculated lens chief ray angle versus field for the lens of FIG. 3 along with the target chief ray angles for an exemplary image sensor (detector)

Specified in terms of modulation transfer function (MTF) rather than third order aberrations, exemplary target values for the MTF in the region of interest are provided in Table 3, which may be selected with regard to the detector to be used at the image plane. Specifically, the size and spacing of the pixels on the detector can establish the Nyquist frequency for the MTF design targets. For example, in the case of an exemplary detector having a pixel size of 1.34 µm×1.34 µm (OV16825 16-megapixel CameraChip™ sensor, OmniVision Technologies, Inc., Santa Clara, Calif., USA), one quarter of the Nyquist frequency would correspond to 93 lp/mm, and one half of the Nyquist frequency would correspond to 187 lp/mm. The calculated performance for the design of the lens 200 of FIG. 3 with regard to MTF is illustrated in FIGS. 5, 6, and 8, as well as Table 4. Performance of the design of the lens 200 of FIG. 3 in terms of spot diagrams as illustrated in FIG. 7. In addition, the ability to properly illuminate the detector at the image plane is illustrated in terms of relative illumination in FIG. 9, which illustrates that 80% relative illumination is maintained out to 105°. This result is consistent with proper control of the chief ray angles as illustrated in FIG. 10, which shows that the lens chief ray angle may be maintained ±2° from the target detector chief ray angle over 60% of field.

Figure 11:
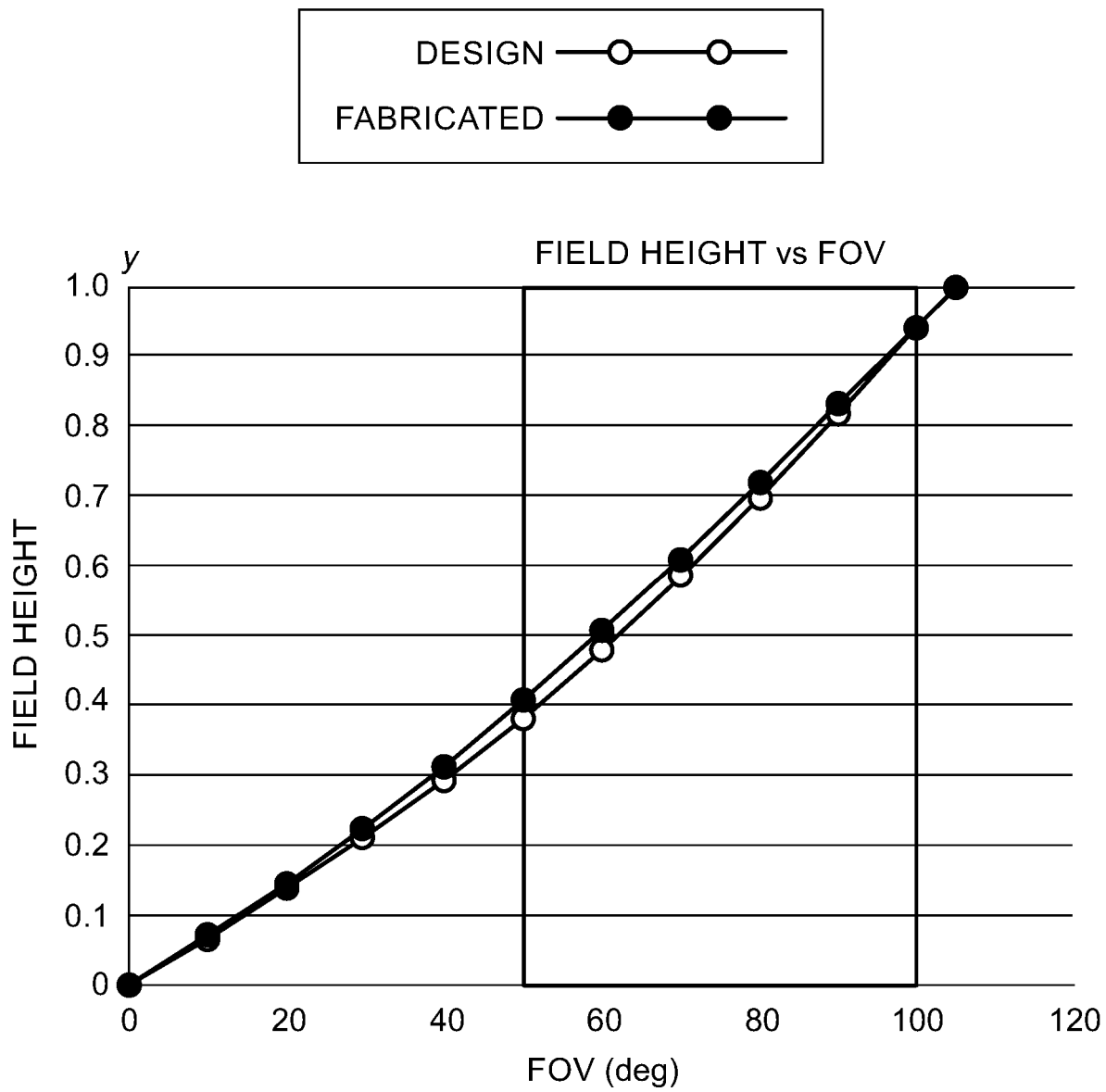
FIG. 11 illustrates field height versus field of view for the lens of FIG. 3 as designed and fabricated.

In addition, designs in accordance with the present invention, including that of lens 200, may seek to optimize mapping of the angular field-of-view onto the detector in a manner that is both linear in the region of interest (e.g., annular cone beginning at 50° from the optical axis and extending to 100° from the optical axis) and maximizes the number of pixels on the image sensor S20 onto which the region of interest of the field-of-view is mapped. In particular, FIG. 11 illustrates that the field of view over the region of interest is substantially linearly mapped onto the field at the image sensor S20, with 50° field of view mapping to h=0.4 relative field height and 100° mapping to H=0.95 relative field height, for a ratio of H/h=2.375 on the image detector. The number of pixels covered on the image sensor may also be optimized in this region, with roughly 970 pixels disposed within the field-of-view between 50° and 100° for the exemplary sensor model OV16825 mentioned above, where the number of pixels is counted along a line taken along one of the two orthogonal directions on which the 1.34 µm×1.34 µm grid of pixels of the image sensor is organized. For this pixel size, 970 pixels corresponds to 1.3 mm (970×1.34 µm). Thus, the annular field-of-view between 50° and 100° maps to a linear distance of about 1.3 mm taken along one of the two orthogonal axes of the sensor grid.

Specified more generally, the region of interest may extend between a first angle and a second angle from the optical axis in object space, where the ratio of the second angle to the first angle is R and may be in the range of R=1.67:1 to 2.5:1. The lens may be configured and constructed such that a ray of the second angle in object space intersects the lens image plane at a distance, H, from the optical axis and a ray of the first angle in object space intersects the lens image plane at a distance, h, from the optical axis such that H/h>R, or preferably H/h≥1.1×R, or more preferably H/h≥1.5×R.

Another metric for specifying the angular mapping of the region of interest onto the image plane may be provided with respect to the full field-of-view, FOV, and half field-of-view, $FOV_{1/2}$, that is $FOV/FOV_{1/2}=2$. The lens may be constructed and arranged such that a ratio of a diameter ($D_1$) at the image plane of an image circle of the full field-of-view versus the diameter ($D_{1/2}$) of an image circle of the central half field-of-view is $D_1/D_{1/2}>2$. Also $D_1/D_{1/2}\geq 2.2$, or preferably $D_1/D_{1/2}\geq 2.5$, or more preferably $D_1/D_{1/2}\geq 3$. For example, seventy-five percent or more of pixel sensor elements of the image sensor may be disposed in the image region corresponding to the annular field-of-view between 50° and 100°. Again, the angular mapping of the field of view in the region of interest onto the image plane may be substantially linear.

TABLE 3

| MTF design target values | | |
|---|---|---|
| FOV (deg) | MTF at 95 lp/mm | MTF at 190 lp/mm |
| 50 | 0.8 | 0.6 |
| 60 | 0.8 | 0.6 |
| 70 | 0.75 | 0.55 |
| 80 | 0.7 | 0.5 |
| 90 | 0.6 | 0.4 |
| 100 | 0.5 | 0.3 |

TABLE 4

| Nine element design Results | | | | |
|---|---|---|---|---|
| Item | | Specification | | Notes |
| Image Sensor Resolution | | 4608 * 3456 | | (1/2.3 inch) |
| Image Sensor Pixel Size | | 1.34 µm * 1.34 µm | | |
| Effective Focal Length | | 0.93 mm | | |
| F. No. | | 2.4 | | |
| Object Distance | | 10 cm to infinity | | |
| View Angle | Horizontal | — | | Image Height = 3.087 mm |
| | Vertical | 210 deg. | | Image Height = 2.271 mm |
| | Diagonal | — | | Image Height = 3.859 mm |
| Resolution (MTF) | 50 deg | 44.9%(T) | 59.5%(S) | at 187 lp/mm |
| | 60 deg | 40.8%(T) | 58.6%(S) | (½ Nyquist freq.) |
| | 70 deg | 39.5%(T) | 56.8%(S) | |
| | 80 deg | 39.3%(T) | 56.7%(S) | |
| | 90 deg | 37.4%(T) | 57.9%(S) | |
| | 100 deg | 36.9%(T) | 55.4%(S) | |
| | 50 deg | 73.1%(T) | 78.9%(S) | at 93 lp/mm |
| | 60 deg | 70%(T) | 78.1%(S) | (¼ Nyquist freq.) |
| | 70 deg | 68.3%(T) | 77.1%(S) | |
| | 80 deg | 67.8%(T) | 77.2%(S) | |
| | 90 deg | 67.2%(T) | 77.9%(S) | |
| | 100 deg | 64.8%(T) | 75.9%(S) | |

TABLE 4-continued

Nine element design Results

| Item | Specification | Notes |
|---|---|---|
| F-theta Distortion | 33% | |
| Relative Illumination | 82% | at full image height |
| CRA on Sensor | <4.44 deg. | |
| Total Track Length | 54.07 mm | |
| Optical Length | 54.07 mm | |
| Max. Image Circle | 4.6 mm | |

TABLE 5

Lens Chief Ray Angle (CRA)

| Image | Field | CRA (deg.) |
|---|---|---|
| 0.000 | 0 | 0.00 |
| 0.389 | 0.1 | 0.14 |
| 0.778 | 0.2 | 0.97 |
| 1.167 | 0.3 | 2.40 |
| 1.556 | 0.4 | 3.60 |
| 1.945 | 0.5 | 4.05 |
| 2.271 | 0.6 | 4.44 |

TABLE 6

Sensor Chief Ray Angle (CRA)

| Image | Field | CRA (deg.) |
|---|---|---|
| 0.000 | 0 | 0.00 |
| 0.389 | 0.1 | 0.69 |
| 0.778 | 0.2 | 1.43 |
| 1.167 | 0.3 | 2.27 |
| 1.556 | 0.4 | 3.20 |
| 1.945 | 0.5 | 4.22 |
| 2.334 | 0.6 | 5.27 |

TABLE 7

| Lens 210 deg FOV | | Image Sensor OV16825 (1/2.3") 4608 × 3456, 1.34 μm | |
|---|---|---|---|
| FOV (degree) | Real Height | Field | Pixel |
| 0 | 0 | 0 | 0 |
| 10 | 0.163 | 0.070 | 122 |
| 20 | 0.333 | 0.144 | 248 |
| 30 | 0.515 | 0.222 | 384 |
| 40 | 0.712 | 0.307 | 531 |
| 50 | 0.925 | 0.400 | 690 |
| 60 | 1.154 | 0.498 | 861 |
| 70 | 1.393 | 0.602 | 1040 |
| 80 | 1.640 | 0.708 | 1224 |
| 90 | 1.894 | 0.818 | 1413 |
| 100 | 2.143 | 0.926 | 1599 |
| 105 | 2.271 | 0.981 | 1694 |

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims. Furthermore, the transitional terms "comprising" and "consisting of" when used in the appended claims define the claim scope with respect to what unrecited additional claim elements or steps, if any, are excluded from the scope of the claims. The term "comprising" is intended to be inclusive or open-ended and does not exclude any additional unrecited element or material. The term "consisting of" excludes any element or material other than those used in connection therewith as specified in the claims.

What is claimed is:

1. A wide angle lens having an angular field of view, FOV, of more than 150 degrees spanning an optical axis and a central half-field of view, $FOV_{1/2}$, spanning the optical axis such that a ratio of the angular range $FOV_{1/2}$ of the central half field of view versus the angular range of the field of view FOV is $FOV/FOV_{1/2}=2$, the lens being constructed and arranged such that a ratio of a diameter ($D_1$) at an image plane of an image circle of the field of view versus the diameter ($D_{1/2}$) of an image circle of the central half-field of view is $D_1/D_{1/2}>2$ and comprising a region of interest disposed between the $FOV_{1/2}$ and FOV, wherein the lens has a longitudinal spherical aberration throughout the region of interest less than half of the longitudinal spherical aberration on-axis.

2. A wide angle lens of claim 1 wherein $D_1/D_{1/2} \geq 2.2$.

3. The wide angle lens of claim 1, comprising a region of interest disposed between the $FOV_{1/2}$ and FOV, wherein angular mapping of the field of view in the region of interest onto the image plane is substantially linear.

4. The wide angle lens of claim 1, comprising a region of interest disposed between the $FOV_{1/2}$ and FOV, wherein the lens has a field curvature for tangential rays on-axis greater than the field curvature for tangential rays throughout the region of interest.

5. The wide angle lens of claim 1, comprising a region of interest disposed between the $FOV_{1/2}$ and FOV, wherein the lens has a field curvature for tangential rays throughout the region of interest less than one quarter of the field curvature for tangential rays on-axis.

6. The wide angle lens of claim 1, comprising a region of interest disposed between the $FOV_{1/2}$ and FOV, wherein the lens has a modulation transfer function of at least 55% at 187 lp/mm for sagittal rays in the region of interest.

7. The wide angle lens of claim 1, comprising a region of interest disposed between the $FOV_{1/2}$ and FOV, wherein the lens has a modulation transfer function of at least 76% at 93 lp/mm for sagittal rays in the region of interest.

8. The wide angle lens of claim 1, comprising a region of interest disposed between the $FOV_{1/2}$ and FOV, wherein the lens has a modulation transfer function of at least 36% at 187 lp/mm for tangential rays in the region of interest.

9. The wide angle lens of claim 1, comprising a region of interest disposed between the $FOV_{1/2}$ and FOV, wherein the lens has a modulation transfer function of at least 65% at 93 lp/mm for tangential rays in the region of interest.

10. The wide angle lens of claim 1, wherein the lens comprises all spherical surfaces.

11. The wide angle lens of claim 1, wherein an effective focal length is 1 mm or less.

12. The wide angle lens of claim 1, wherein an f-number is 2.4 or less.

13. The wide angle lens of claim 1, wherein an f-theta distortion is 34% or less at full field.

14. The wide angle lens of claim 1, wherein a chief ray angle at an image plane of the wide angle lens is less than 4.5 degrees from a normal to a surface at an image plane.

15. The wide angle lens of claim 1, wherein a back focal length is 1 mm or less.

16. A wide angle lens having an angular field of view, FOV, of more than 150 degrees spanning an optical axis and a central half-field of view, $FOV_{1/2}$, spanning the optical axis such that a ratio of the angular range $FOV_{1/2}$ of the central half field of view versus the angular range of the field of view FOV is $FOV/FOV_{1/2}=2$, the lens being constructed and arranged such that a ratio of a diameter ($D_1$) at an image plane of an image circle of the field of view versus the diameter ($D_{1/2}$) of an image circle of the central half-field of view is $D_1/D_{1/2}>2$, wherein the full field of view spanning the optical axis is 200 degrees.

17. A camera system comprising the wide angle lens according to claim 16 and comprising an image sensor having an imaging surface area placed at the image plane.

18. A wide angle lens of claim 16, wherein $D_1/D_{1/2} \geq 2.2$.

19. A wide angle lens of claim 16, wherein $D_1/D_{1/2} \geq 2.5$.

20. A wide angle lens of claim 16, wherein $D_1/D_{1/2} \geq 3$.

21. The wide angle lens of claim 16, comprising a region of interest disposed between the $FOV_{1/2}$ and FOV, wherein angular mapping of the field of view in the region of interest onto the image plane is substantially linear.

22. The wide angle lens of claim 16, comprising a region of interest disposed between the $FOV_{1/2}$ and FOV, wherein the lens has a longitudinal spherical aberration on-axis greater than the longitudinal spherical aberration throughout the region of interest.

23. The wide angle lens of claim 16, comprising a region of interest disposed between the $FOV_{1/2}$ and FOV, wherein the lens has a longitudinal spherical aberration throughout the region of interest less than half of the longitudinal spherical aberration on-axis.

24. The wide angle lens of claim 16, comprising a region of interest disposed between the $FOV_{1/2}$ and FOV, wherein the lens has a field curvature for tangential rays on-axis greater than the field curvature for tangential rays throughout the region of interest.

25. The wide angle lens of claim 16, comprising a region of interest disposed between the $FOV_{1/2}$ and FOV, wherein the lens has a field curvature for tangential rays throughout the region of interest less than one quarter of the field curvature for tangential rays on-axis.

26. The wide angle lens of claim 16, comprising a region of interest disposed between the $FOV_{1/2}$ and FOV, wherein the lens has a modulation transfer function of at least 55% at 187 lp/mm for sagittal rays in the region of interest.

27. The wide angle lens of claim 16, comprising a region of interest disposed between the $FOV_{1/2}$ and FOV, wherein the lens has a modulation transfer function of at least 76% at 93 lp/mm for sagittal rays in the region of interest.

28. The wide angle lens of claim 16, comprising a region of interest disposed between the $FOV_{1/2}$ and FOV, wherein the lens has a modulation transfer function of at least 36% at 187 lp/mm for tangential rays in the region of interest.

29. The wide angle lens of claim 16, comprising a region of interest disposed between the $FOV_{1/2}$ and FOV, wherein the lens has a modulation transfer function of at least 65% at 93 lp/mm for tangential rays in the region of interest.

30. The wide angle lens of claim 16, wherein the lens comprises all spherical surfaces.

31. The wide angle lens of claim 16, wherein an effective focal length is 1 mm or less.

32. The wide angle lens of claim 16, wherein an f-number is 2.4 or less.

33. The wide angle lens of claim 16, wherein an f-theta distortion is 34% or less at full field.

34. The wide angle lens of claim 16, wherein a chief ray angle at an image plane of the wide angle lens is less than 4.5 degrees from a normal to a surface at an image plane.

35. The wide angle lens of claim 16, wherein a back focal length is 1 mm or less.

36. A camera system comprising the wide angle lens according to claim 1 and comprising an image sensor having an imaging surface area placed at the image plane.

37. A wide angle lens of claim 1, wherein $D_1/D_{1/2} \geq 2.2$.

38. A wide angle lens of claim 1, wherein $D_1/D_{1/2} \geq 2.5$.

39. A wide angle lens of claim 1, wherein $D_1/D_{1/2} \geq 3$.

* * * * *